COLOUR TELEVISION TRANSMITTERS

Filed April 26, 1963

INVENTORS.
Henri de France
Bernard Dognin
Gérard Melchior
By Kurt Kelman
AGENT

United States Patent Office 3,290,433

Patented Dec. 6, 1966

3,290,433

COLOUR TELEVISION TRANSMITTERS

Henri de France, Bernard Dognin, and Gérard Melchior, Levallois-Perret, France, assignors to Compagnie Francaise de Television, a corporation of France Filed Apr. 26, 1963, Ser. No. 276,013
Claims priority, application France, May 2, 1962, 896,176
10 Claims. (Cl. 178—5.4)

The present invention relates to colour television transmitters and more particularly to transmitters of the type wherein a first picture signal is transmitted simultaneously with a wave which is frequency-modulated by another picture signal, the frequency-modulated wave occupying a portion of the frequency spectrum of the first picture signal.

Such is the case in the sequential-simultaneous colour television system with memory. In this system, a carrier wave is modulated by a composite signal comprising a luminance signal and a subcarrier, the latter being sequentially modulated by two colour signals, alternating at the line frequency. The subcarrier lies preferably in the upper portion of the spectrum of the luminance signal. At the receiving end the two sequential signals which modulate the subcarrier are converted into simultaneous signals through repeating each of them during the line periods during which it is not transmitted.

Experience has shown that it is advantageous, for various technical reasons, such as for example the transmission stability, to modulate the subcarrier in frequency.

In the receiver, the modulated subcarrier is extracted from the composite signal by means of a band-pass filter, which, of course, also passes those frequency components of the luminance signal which lie in the same frequency band.

Generally, those components, which, for short, will be referred to as the "interfering components" of the luminance signal, have amplitudes which are low enough for not distorting substantially the colour signals obtained by demodulation of the subcarrier. However, it may occur that that portion of the luminance signal consisting of the interfering components has a sufficient level for causing momentary distortions of the colour signals.

It is an object of the invention to eliminate this drawback without affecting the luminance signal to a substantial degree, by means of circuit modifying the relative amplitude of the subcarrier with respect to the interfering components of the luminance signal so that this relative amplitude should remain high enough for allowing a faithful restitution of the colour signals.

According to the invention, a colour television transmitter comprises, means for generating a first picture signal having a first frequency band; means for generating a second picture signal; means for frequency modulating said second picture signal on a wave to provide a frequency-modulated wave having a second frequency band lying within said first frequency band; a circuit, responsive to the components of said first picture signal lying within said second frequency band for maintaining to a sufficient level the relative amplitude of said frequency-modulated wave with respect to said components; and means, coupled to the output of said circuit, for transmitting over a common channel said first picture signal and said frequency-modulated wave.

According to a first embodiment of the invention, the aforesaid circuit is a circuit for limiting the amplitudes of the interfering components of the luminance signal.

According to another embodiment of the circuit according to the invention, the effect thereof is an amplitude modulation of the frequency-modulated wave as a function of the level of the envelope of the interfering components of the luminance signal.

The invention will be best understood from the following description and appended drawings, wherein.

The invention will be described as applied to a specific embodiment of the above mentioned sequential-simultaneous colour television system with memory.

In this precise example, the first picture signal is a luminance signal with a bandwidth of 6 mc./s. The colour signals alternating at the line frequency, have a common bandwidth of 700 kc./s., and they are sequentially frequency-modulated on a subcarrier, the center frequency of which is 4.43 mc./s., the frequency swing covering 350 kc./s. on each side of the center freqency. The luminance signal and the frequency-modulated subcarrier wave are added to form a composite signal, which is amplitude-modulated on the carrier wave, the modulation being of the vestigial side-band type.

In the receiver, the carrier wave is detected, and the modulated subcarrier wave is extracted from the composite signal thus obtained by means of a band-pass filter centered on 4.43 mc./s., and having a pass-band which is of the order of 1 mc./s. on each side of the center frequency for an attenuation less than 3 db below the maximum.

There is thus defined, in the spectrum of the luminance signal, a critical frequency band, which will be referred to as band SC, the center frequency of which is 4.43 mc./s., and the width of which may be defined in the same way as the pass band of the aforesaid filter.

Figure 1:
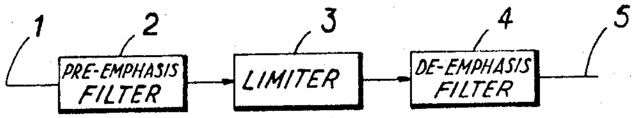
FIG. 1 is a block diagram of a first embodiment of the circuit according to the invention.

FIG. 1 is a block diagram of a transmitter circuit employing the invention. Input 1 receives the luminance signal from the preceding transmitter circuits, for example from the output of the last amplifier. Input 1 feeds a pre-emphasis filter 2, which considerably raises the relative amplitudes of the spectral components in the frequency range SC with respect to those of the other spectral components of the luminance signal.

The pre-emphasis filter 2 feeds an amplitude limiter 3, which limits to a value N, which will be defined hereinafter, the amplitudes of the components of its input signal. The amplitude limiter 3 feeds a de-emphasizing filter 4 whose amplitude-frequency characteristic is the reverse of that of the emphasizing filter 2, so that, were it not for the amplitude limiter 3, the relative amplitudes of the spectral components of the signals applied to input 1 would remain unchanged after having passed through filters 2 and 3. The amplification of the video channel preceding the circuit of FIG. 1 is such that, in the absence of limiter 3, the level of the output 5 of the circuit would be that suitable for the mixing of these signals with the frequency modulated subcarrier, for the subsequent modulation of the carrier.

Level N and the pre-emphasis effected on the components of the luminance signal belonging to be the frequence band SC are such that the action of limiter 3 does not practically affect the components of the luminance signal other than those belonging to band SC, but merely limits those belonging to this band to a level such that, by passing through the de-emphasizing filter, they are brought to an acceptable level with respect to that of the frequency-modulated subcarrier. The latter has a fixed amplitude, since the frequency modulator where it is modulated is followed, as usually, by an amplitude limiter. It is thus seen that only the components belonging to be the band SC of the luminance signal are damped, this action taking place only if their amplitude reaches an objectional level.

The luminance signal collected at output 5 is then mixed with the synchronisation signals and with the modulated subcarrier, for the purpose of amplitude modulating the carrier according to known art.

This arrangement does not involve any modification of the receivers. Experience has shown that the attenuation of the interfering components of the luminance signal, which, statistically speaking, does not occur very often, does not affect to any substantial degree the quality of the colour picture, reproduced in the colour receivers, or the monochrome picture received by monochome receivers using only the luminance signal.

Figure 2:
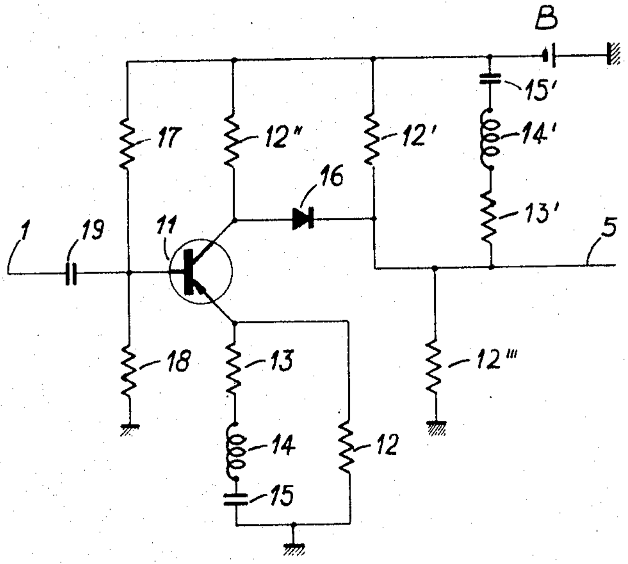
FIG. 2 is a practical embodiment of a circuit according to the block diagram of FIG. 1.

FIG. 2 is a peferred practical embodiment of the circuit of FIG. 1.

In this figure, a p-n-p type transistor 11, with common emitter, has its base connected, through a coupling capacitor 19, to the input 1 of the circuit. The base of the transistor is biased by means of a bridge, including resistances 17 and 18, which is connected between the negative pole of D.C. voltage source B and ground, the positive terminal of source B being also grounded.

The emitter of transistor 11 is grounded through a network including a resistance 12 in parallel with a resistance 13 followed by a coil 14 and a capacitor 15; the series circuit 14–15 resonates at the frequency $f$ of the subcarrier. The collector of transistor 11 is connected to one terminal of a resistance 12″, the other terminal of which is connected to the negative terminal of source B, and to the anode of a diode 16. The cathode of diode 16 is connected to the negative pole of source B through a resistance 12′ and also through a series circuit including a resistance 13′, a coil 14′ and a capacitor 15′.

The cathode of diode 16 is also grounded through a resistance 12‴.

The following relations exist between the values R, R′, R″ and R‴ of resistors 12, 12′, 12″ and 12‴ respectively, the values $r$ and $r'$ of resistors 13 and 13′, the values of L and L′ of coils 14 and 14′, and the values C and C′ of capacitors 15 and 15′:

$$r/r'=L/L'=C'/C=R/\rho=k \quad (1)$$

where $k$ is a constant and $1/\rho=1/R'+1/R''+1/R'''$, $\rho$ being thus the resistance equivalent to resistance 12′, 12″ and 12‴ in parallel.

The series circuit 14′–15′ thus also resonates at the subcarrier frequency. The output 5 of the circuit is connected to the cathode of diode 16. The system operates as follows:

The network 13–14–15 of the load circuit of the emitter of transistor 11 has a low impedance for the frequencies near the central frequency $f$ of the subcarrier. The value $r$ of the resistance 13 however is selected such as to ensure a suitable minimum impedance of this network and in every case a negative feedback which is sufficiently high for the gain of the transistor to be considered, at any frequency, as substantially equal to the ratio of the load impedance of the collector to the emitter impedance.

The luminance signal is applied to the base of transistor 11.

For all the frequencies of the input signal, the load impedance of the collector, taking into account the relations (1), is equal to $k$ times the emitter impedance.

The gain of the circuit is thus equal to $k$ for all the frequencies, provided diode 16 is conducting, its resistance being negligible. When the ampltiude of the A.C. components on the emitter is low, this condition is satisfied, because of the fraction of the D.C. component of the collector current flowing through the diode.

This occurs for the frequencies remote from the frequency $f$, for which the impedance of the emitter circuit is high.

If, on the contrary, the region SC of the spectrum of the input signal includes high-amplitude components, the emitter and collector impedance being low for this frequency band, the high amplitude components will be limited by diode 16.

Figure 3:
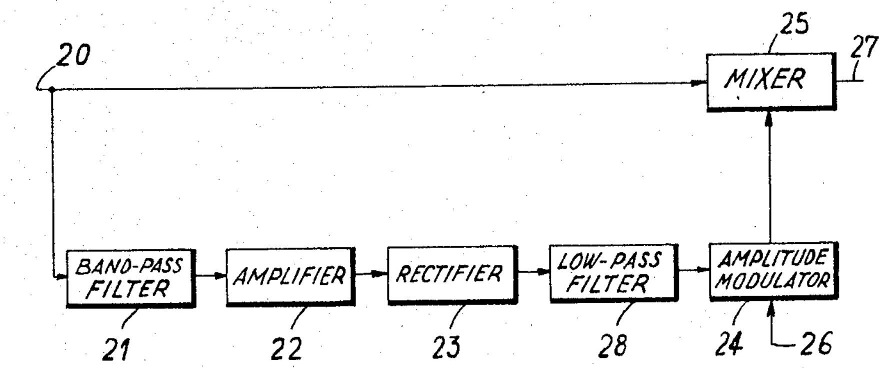
FIG. 3 is a block diagram of another embodiment of the circuit according to the invention.

FIG. 3 is a block diagram of a further embodiment of the invention, wherein the amplitude of the frequency modulated subcarrier is modified as a function of the level of the envelope of the signal built up by the interfering components of the luminance signal.

Input 20 receives the luminance signal. It feeds the first input of a mixer 25, wherein the luminance signal and the frequency-modulated subcarrier are mixed. Input 20 also feeds a series circuit including a filter 21, the frequency-amplitude characteristic of which is the same as that of the band pass filter used in the receiver for extracting the modulated subcarrier from the composite signal, an amplifier 22, a rectifier 23 and a low-pass filter 28.

The output of filter 28 feeds the modulation input of an amplitude modulator, 24, the second input 26 of which receives the subcarrier, frequency modulated by the colour signals.

The output of modulator 24 is connected to the second input of mixer 25, the output 27 of which is the output of the circuit.

The signal appearing at this output is mixed with the synchornization signals for the purpose of modulating the carrier.

The systems of FIG. 3 operates as follows:

Filter 21 derives from the luminance signal the components comprised in band SC defined hereinbefore. These components are amplified in amplifier 22, detected in a conventional detector circuit including rectifier 23 and the low-pass filter 28, so as to obtain the envelope of the output signal of filter 21. The output signal of filter 28 modulates in amplitude the previously frequency modulated and amplitude limited subcarrier.

The modulation factor is selected such that the amplitude of the subcarrier should always be sufficiently high as compared with the level of the output signal of filter 28.

The system may, if desired, comprise a threshold circuit between the low-pass filter 28 and the modulator 24 so that the modulation should start operating only above a critical level of the output signal of filter 28.

The auxiliary amplitude modulation thus effected is suppressed by the limiter preceding the demodulator of the subcarrier at the receiving and does not call for any modification of the colour receiver. Again experience has shown that also in this case the quality of the images is not affected to any substantial degree by the amplitude modulation of the subcarrier.

It should be noted that the frequency-modulated subcarrier may be subjected to an additional amplitude modulation for other purposes.

If such is the case, the signals which amplitude modulate the subcarrier are preferably added in a mixer, the resulting signal being applied to the input of a single amplitude modulator.

On the other hand, the subcarrier may be eliminated during the whole or a part of the vertical and horizontal blanking intervals by means of an amplitude modulation reducing its amplitude to zero during the appropriate time intervals, but leaving it otherwise unaltered.

This last mentioned modulation of the subcarrier occurs during the vertical and horizontal blanking intervals and not during the picture-signal transmission periods. In this case too, it is possible to use a single amplitude modulator, by mixing all the modulating signals in a mixer.

This invention is of course not limited to the embodiments described and illustrated. In particular, it is applicable when the first signal and a carrier wave frequency modulated by the second signal are transmitted by cable.

What is claimed, is:

1. A colour television transmitter comprising: first means, having an output, for generating a first picture signal having a first frequency band; means for generating a second picture signal; means for frequency-modulating said second picture signal on a wave to provide a frequency-modulated wave having a second frequency band lying within said first frequency band; a circuit, having two inputs respectively; and means having an input coupled to said output of said first means, said circuit having in said second frequency band a gain characteristic which varies as a function of the amplitudes of those frequency components of said first signal lying within said second frequency band, for modifying the amplitudes of at least some of said components relatively to the amplitude of said wave, coupled to the output of said first means and of said circuit, for transmitting over a common channel the sum of said first picture signal and of said frequency-modulated wave.

2. A colour television transmitter comprising: first means, having an output, for generating a first picture signal having a first frequency band; means for generating a second picture signal; means for frequency-modulating said second picture signal on a wave to provide a frequency-modulated wave having a second frequency band lying within said first frequency band; an emphasizing filter having an amplitude/frequency characteristic enhancing the amplitudes of frequency components lying within said second frequency band relatively to the amplitudes of frequency components lying within the remainder of said first frequency band, said emphasizing filter having an input coupled to said output of said first means, and an output; an amplitude limiter having an input coupled to said output last mentioned and an output; a de-emphasizing filter having an amplitude/frequency characteristic which is complementary to that of said emphasizing filter, said de-emphasizing filter having an input coupled to said amplitude limiter output and an output; mixing means having a first input coupled for receiving said frequency modulated-wave, a second input coupled to said de-emphasizing filter output, and an output; and means for transmitting the output signal of said mixing means.

3. A colour television transmitter comprising: first means, having an output, for generating a first picture signal having a first frequency band; means for generating a second picture signal; means for frequency-modulating said second picture signal on a wave to provide a frequency-modulated wave having a second frequency band lying within said first frequency band; a circuit, having an input coupled to said output of said first means, for limiting the amplitudes of the frequency components of said first signal lying within said second frequency band, said circuit having an output; means for mixing the output signal of said circuit and said frequency-modulated wave; and means for transmitting the output signal of said mixing means.

4. A colour television transmitter comprising: first means, having an output, for generating a first picture signal having a first frequency band; means for generating a second picture signal; further means, having an output, for frequency-modulating said second picture signal on a wave to provide a frequency-modulated wave having a second frequency band lying within said first frequency band; a circuit, having two inputs respectively coupled to said outputs of said first and further means, for modulating the amplitude of said frequency-modulated wave as a function of the components of said first picture signal lying within said second frequency band, said circuit having an output; and means, having two outputs respectively coupled to the outputs of said first means and of said amplitude modulating means, for transmitting over a common channel the sum of the output signal of said amplitude-modulating means and of said first picture signal.

5. A colour television transmitter comprising: first means, having an output, for generating a first picture signal having a first frequency band; means for generating a second picture signal; means for frequency-modulating said second picture signal on a wave to provide a frequency-modulated wave having a second frequency band lying within said first frequency band; band-pass filter having an input and an output; means for applying said first picture signal to said input; detecting means having an input coupled to said filter output and an output; an amplitude-modulator having a modulation input coupled to said detecting means output and a second input; means for applying said frequency-modulated wave to said second input of said amplitude modulator; mixing means having a first input coupled to said output of said first means, a second input coupled to said amplitude modulator output, and an output; and means for transmitting the output signal of said mixing means.

6. A colour television transmitter as claimed in claim 5, wherein a base-clipping threshold device is inserted between said detecting means and said modulator input.

7. A colour television transmitter as claimed in claim 1, wherein said second picture signal is a sequential signal comprising two colour signals alternating at the line frequency.

8. A colour television transmitter as claimed in claim 2, wherein said second picture signal is a sequential signal comprising two colour signals alternating at the line frequency.

9. A colour television transmitter as claimed in claim 5, wherein said second picture signal is a sequential signal comprising two colour signals alternating at the line frequency.

10. A colour television transmitter comprising: first means, having an output, for generating a first picture signal having a first frequency band; means for generating a second picture signal; means for frequency-modulating said second picture signal on a wave to provide a frequency-modulated wave having a second frequency band lying within said first frequency band; a band-pass filter having an input and an output; means for applying said first picture signal to said input; detecting means having an input coupled to said filter output and an output; an amplitude-modulator having a modulation input coupled to said detecting means output and a second input; means for applying said frequency-modulated wave to said second input of said amplitude modulator; mixing means having a first input coupled to said output of said first means, a second input coupled to said amplitude modulator output, and an output; and means for modulating on a carrier wave the output signal of mixing said means.

References Cited by the Examiner

UNITED STATES PATENTS

| | | | |
|---|---|---|---|
| 2,410,489 | 11/1946 | Fitch | 325—46 |
| 2,558,489 | 6/1951 | Kalfaian | 178—5.2 |
| 2,841,638 | 7/1958 | Rieke | 325—46 X |
| 2,870,284 | 1/1959 | Valeton et al. | 178—5.2 |
| 2,912,492 | 11/1959 | Haantjes et al. | 178—5.2 |
| 3,064,075 | 11/1962 | Hurford | 178—5.4 |

DAVID G. REDINBAUGH, *Primary Examiner.*

JOHN W. CALDWELL, *Examiner.*

J. H. SCOTT, *Assistant Examiner.*